July 28, 1959 E. J. FORBES 2,897,274

RADIO RELAY STATION WITH DROP CHANNELING

Filed Nov. 24, 1954

INVENTOR.
EDMOND J. FORBES

BY Charles H. Brown

ATTORNEY

United States Patent Office 2,897,274

Patented July 28, 1959

2,897,274

RADIO RELAY STATION WITH DROP CHANNELING

Edmond John Forbes, Haddonfield, N.J., assignor to Radio Corporation of America, a corporation of Delaware Application November 24, 1954, Serial No. 470,976

5 Claims. (Cl. 179—15)

Figure 1:
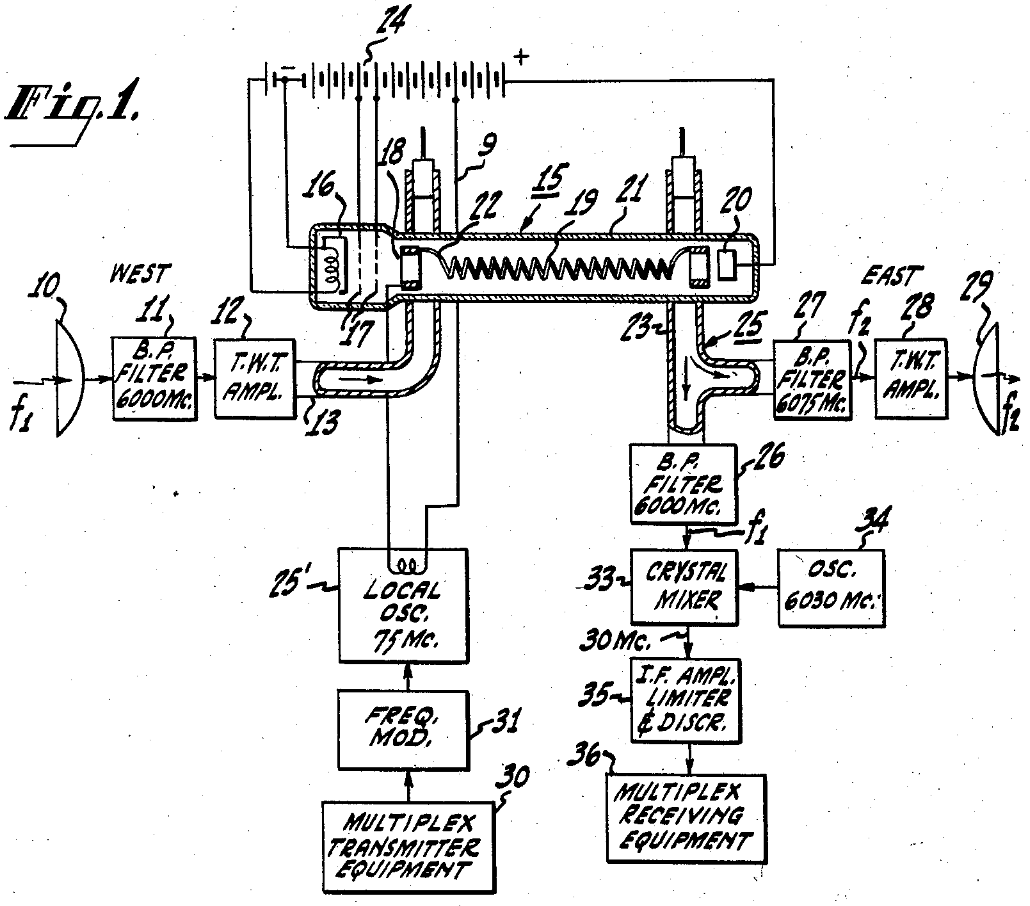

This invention relates to a radio relay system with means for dropping and adding channels, and particularly, to such a system employing a traveling wave tube amplifier-mixer.

In radio relay systems, each relay station receives a signal from one direction, amplifies the signal, and translates the signal to a different frequency for transmission to the next relay station or receiving terminal. The frequency change or translation is made, inter alia, to prevent regenerative feed-back in a loop including the transmitting and receiving antennas and the amplifier of the relay station. When the radio frequency carrier wave of a relay station is modulated with the intelligence signals of a number of channels, such as by frequency division multiplexing, it is often desired to employ some of the channels for messages to the relay station, while others are employed for messages directed thru the relay station toward a more distant terminal. It is also desired to employ some channels to carry messages originating at the relay station and destined for the distant terminal. The process of dropping channels at a relay station and/or adding channels is briefly called "drop channeling." Drop channeling requires some means at the relay station for separating out the signals of channels to be dropped. Since this selection cannot be made at the carrier radio frequencies, it is customary to heterodyne the received signal down to an intermediate frequency for channel separation and addition purposes, and to then heterodyne the signal up again for retransmission. This is called the intermediate frequency system. In another system of drop channeling, called the radio frequency system, the received signal is mixed with a local oscillator signal which is modulated with channels to be added. The output of the mixer contains a radio frequency signal at a displaced frequency for transmission toward the distant terminal, and also a radio frequency signal at the received frequency which may be heterodyned down for the taking-off of channels to be dropped.

In relay systems operating at the ultra-high frequencies and super-high frequencies, above about 2000 megacycles, traveling wave tubes are particularly advantageous for use as radio frequency amplifiers. Traveling wave tubes also may be used as mixers to translate the received signal to a different frequency for transmission to the distant terminal. If the output of the translating local oscillator is used to modulate the beam voltage, i.e., the anode-cathode or helix-cathode voltage of the electron gun in the traveling wave tube, the received signal is phase-modulated to provide an output signal having a frequency which is the sum or difference of the received signal frequency and local oscillator frequency, for transmission to the distant terminal.

An object of this invention is to provide an improved drop channeling radio relay station employing traveling wave tubes.

Another object is to provide an improved radio relay station including a traveling wave tube mixer-amplifier constructed to optimize the amplification of thru channels and dropped channels.

In one aspect, the invention comprises a radio-relay station receptive to a received intelligence modulated signal at frequency $f_1$. The intelligence modulation may include many message channels. The received signal is applied to the signal input of a mixer-amplifier traveling wave tube. The output of a local oscillator at frequency $f_0$ is employed to modulate the beam voltage of the traveling wave tube so that the output of the traveling wave tubes includes an intelligence modulated signal at frequency $f_2$ (where $f_2=f_1$ plus or minus $f_0$) and also an intelligence modulated signal at frequency $f_1$. The two signals are separated by filters. Signal $f_2$ is transmitted to a distant terminal, and signal $f_1$ is heterodyned down to an intermediate frequency and demodulated to extract the intelligence on the channels to be dropped. The local oscillator signal at frequency $f_0$ is frequency modulated by message channels to be added and transmitted on to the distant terminal. The level or amplitude of the local oscillator signal applied to the traveling wave tube is adjusted to provide a phase shift in the traveling wave tube of 1.4 radians, or stated another way, to provide a modulation index of 1.4.

Figure 2:
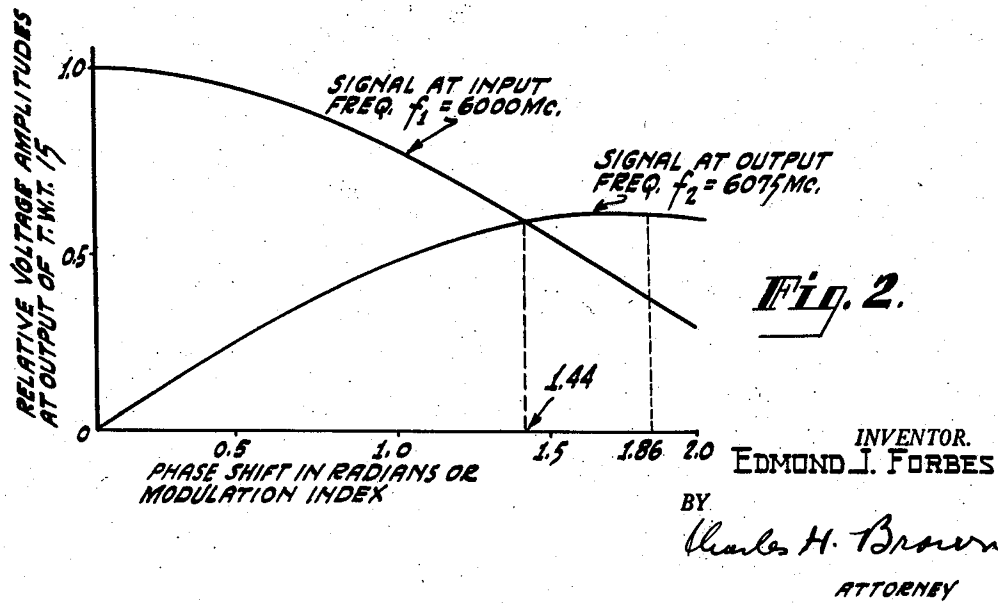

These and other objects and aspects of the invention will be apparent to those skilled in the art from the following more detailed description, taken in conjunction with the appended drawing, wherein:

Figure 1 is a diagram of a radio relay station including a traveling wave tube mixer-amplifier, and including means for adding and dropping channels, in accordance with the present invention; and Figure 2 is a chart of the relative voltages of two signals available at the output of the traveling wave tube mixer-amplifier in the system of Figure 1, which will be used in explaining the operation of the invention.

In the relay station shown in Figure 1, an intelligence modulated signal at frequency $f_1$ transmitted from a remotely located station is received by directional receiving antenna 10, is passed by a band-pass filter 11, and is amplified by a traveling wave tube amplifier 12. The received signal $f_1$ may, by way of example, include a radio frequency carrier at 6000 megacycles frequency modulated by, say 20 intelligence channels each 5 kilocycles wide. The received signal $f_1$ may include frequency components in the range between 5,999.75 and 6000.25 megacycles. The width of this band depends of course on the extent of the modulation deviation employed. The traveling wave tube amplifier 12 may be any suitable amplifier, such as is described in an article entitled "New Developments In Traveling Wave Tubes," by W. J. Dodds, R. W. Peter and S. F. Kaisel, appearing at pages 130–133 of the February, 1953 issue of "Electronics."

The output of the traveling wave tube amplifier 12 is applied thru a waveguide 13 to the input of a traveling wave tube mixer-amplifier generally designated 15. The traveling wave tube 15 includes a cathode 16, accelerating and focusing electrodes 17, a cylindrical terminating member 18 for the helix 19, and a collector electrode 20. These elements are enclosed within an evacuated envelope 21, such as glass, around which is disposed an electromagnet (not shown). The radio frequency energy applied thru the waveguide 13 is coupled to the helix antenna 22, and the amplified output of the traveling wave tube is coupled to the output waveguide 23. A battery or other suitable source 24 provides direct current potentials for the various electrodes of the traveling wave tube.

The output of a local oscillator 25' having a frequency $f_0$, which may for example be a frequency of 75 megacycles, is coupled to the traveling wave tube to modulate the electron beam passing from the cathode 16 to the collector electrode 20. The local oscillator output wave is super-imposed on the direct current polarizing potential applied from the battery 24 by lead 9 to the cylindrical helix terminating member 18. The effect of this arrangement is to modulate the direct current accelerating voltage effective on the electron beam at the frequency of the local oscillator 25'. Alternatively, the beam voltage may be modulated by coupling the output of oscillator 25' in another of the leads extending from the direct current source 24 to the electrodes of the traveling wave tube.

The local oscillator signal at frequency $f_0$ phase modulates the received signal $f_1$ in the traveling wave tube 15. The output of the traveling wave tube in the waveguide 23 includes the original received signal at frequency $f_1$ and first order sidebands at frequencies of $f_1$ plus and minus $f_0$. Only one of the first order sidebands is utilized, and it will be designated $f_2$. It will be understood that the signal in waveguide 23 at frequency $f_1$ and the signal at frequency $f_2$ both include the intelligence modulation present on the radio frequency wave received by antenna 10.

The output of the traveling wave tube 15 in waveguide 23 is applied thru a symmetrical T junction 25 having one leg coupled to a bandpass filter 26, and having the other leg coupled to bandpass filter 27. Bandpass filter 27 is designed to pass the signal $f_2$, which in the present example is a frequency of 6075 megacycles, to a power traveling wave tube amplifier 28 having an output coupled to a directional transmitting antenna 29.

That part of the radio relay station of Figure 1 which has thus far been described, comprises means to receive a signal at frequency $f_1$, means to amplify the signal in traveling wave tube amplifier 12, means to mix and amplify the received signal together with the local oscillator signal in the traveling wave tube 15, and means to select, amplify, and retransmit the signal at the translated frequency $f_2$. The means for adding and dropping channels will now be described.

The local oscillator 25' is frequency modulated with intelligence signal originating at the relay station. This is accomplished by means of conventional frequency division multiplex transmitting equipment 30 having an output coupled to a frequency modulator 31, which is in turn coupled to the local oscillator 25'. The multiplex transmitting equipment 30 has a plurality of audio inputs, and these audio signals are heterodyned to non-overlapping frequency bands falling within the frequency bands of channels not occupied by intelligence from the remote transmitting station. Stated another way, certain intelligence channels are reserved for messages received by and transmitted thru the relay station of Figure 1, and others are reserved for messages originating at the relay station and destined for transmission toward the distant receiving terminal. The multiplex transmitting equipment 30 may be known frequency division multiplexing telephone carrier equipment; the frequency modulator 31 may be a conventional reactance tube modulator, and local oscillator 25' may be any suitable oscillator appropriate to the frequency $f_0$ which is employed.

At the output of the traveling wave tube 15, the bandpass filter 26 is designed to pass the amplified signal at the frequency $f_1$ of the received signal, 6000 megacycles in the present example. The output of the bandpass filter 26 is applied to a diode crystal mixer 33. The output of an oscillator 34 is also applied to the crystal mixer 33. The frequency of the oscillator 34 is selected to provide a difference frequency from the mixer which is suitable for further amplification in an intermediate frequency amplifier. In the present example, the oscillator 34 has a frequency of 6030 megacycles, to provide an intermediate frequency of 30 megacycles in the output of mixer 33. The difference frequency from the crystal mixer 33 is applied to an intermediate frequency amplifier, limiter and discriminator 35. The output of unit 35 is applied to multiplex receiving equipment 36, which may be the conventional frequency division de-multiplexing telephone carrier equipment. The crystal mixer 33, the oscillator 34, and the unit 35 constitute a conventional frequency modulation receiver designed for the frequencies employed in the radio relay system. The conventional multiplex receiving equipment 36 separates the various intelligence modulated channels according to frequency, and translates them to a plurality of audio output signals.

In the operation of the relay station of Figure 1, referring to specific frequencies by way of example, a signal received from the West at a frequency of 6000 megacycles is amplified in amplifier 12 and applied to the signal input of the traveling wave tube mixer-amplifier 15. The received signal at 6000 megacycles is frequency modulated with a number of intelligence channels. There may, for example, be 20 intelligence channels each 5 kilocycles wide and occupying non-overlapping frequency bands between zero cycles and 100 kilocycles.

If it is desired to add four channels at the relay station, the four audio signals are translated in the multiplex transmitting equipment 30 to channel signals 5 kilocycles wide in the range between 100 kilocycles and 120 kilocycles. These four channel signals are applied to the frequency modulator 31 to frequency modulate the 75 megacycle local oscillator 25'. The modulated output of the local oscillator 25' is applied to the traveling wave tube 15 to modulate the electron beam current of the traveling wave tube. The intelligence signals on the 75 megacycle local oscillator occupy a different frequency range from the intelligence signals on the received 6000 megacycle signal.

The 75 megacycle local oscillator signal and the 6000 megacycle received signal are mixed in the traveling wave tube 15 so that the output of the traveling wave tube in waveguide 23 includes the original input signals and also sum and difference frequency signals. The signals in the output of the traveling wave tube are amplified relative to the inputs thereto, but the amplification is not as great as would be provided by the traveling wave tube employed solely as an amplifier. The output signal at a frequency of 6000 megacycles (plus components in the range of, say, plus and minus 0.25 megacycle due to intelligence modulation) is selected by bandpass filter 26, and the output sum frequency of 6075 megacycles (plus components in the same range of plus and minus 0.25 megacycle) is selected by the bandpass filter 27. Signals of all frequencies outside the pass-bands of the filters are rejected thereby. The signals passed by the 6000 megacycle filter and the 6075 megacycle filter both are modulated by both the intelligence channels received on the incoming 6000 megacycle signal and also the intelligence channels on the 75 megacycle local oscillator signal. The 6075 megacycle signal passed by filter 27 is amplified in amplifier 28 and transmitted from directional antenna 29 toward a distant terminal. The transmitted signal carries the intelligence received from the West together with the intelligence inserted at the relay station.

The 6000 megacycle signal passed by the filter 26 is modulated by the intelligence received from the West and also the intelligence locally added to the 75 megacycle local oscillator. The 6000 megacycle signal from filter 26 is heterodyned down to a 30 megacycle intermediate frequency signal which is amplified, limited, and detected to provide a signal wherein the intelligence channels occupy non-overlapping frequency bands between zero cycles and 120 kilocycles. All twenty-four intelligence channels transmitted toward the East from antenna 29 are also available to the multiplex receiving equipment 36. The multiplex receiving equipment 36 selects only those of the intelligence channels which it is desired to translate to audio frequencies for use at the relay station.

Figure 2 is a chart showing the relative voltage amplitudes at the output of the traveling wave tube 15 of the 6000 megacycle signal $f_1$ and the 6075 megacycle signal $f_2$, as a function of the phase shift in radians in the traveling wave tube 15, or the modulation index. The modulation index is a substantially linear function of the amplitude of the local oscillator signal from oscillator 25' applied to the traveling wave tube 15. The curves follow the Bessel functions which correspond with the amplitudes of the carrier $f_1$ and the first order sidebands $f_2$ in the output of a phase modulator. The curve for the signal at frequency $f_2$ is the relative amplitude of one of the first order sidebands which is utilized in the system of Figure 1. The other first order sideband has the same amplitude and shape. The voltage amplitudes are plotted relative to the amplitude of the carrier signal at frequency $f_1$ when no phase modulating voltage is applied from the local oscillator 25' to the traveling wave tube 15.

It will be noted from the chart of Figure 2 that the amplitudes of the signals at frequencies $f_1$ and $f_2$ are equal when the phase shift in radians or the modulation index is equal to 1.44. If the modulation index is increased above this value, there is very little increase in the amplitude of the signal $f_2$ but there is a considerable decrease in the amplitude of the signal $f_1$. Also, if a lower value of modulation index is employed, there is a considerable decrease in the amplitude of the signal $f_2$ which is to be transmitted on to the distant terminal. According to this invention, the amplitude of the output from the local oscillator 25' is adjusted to that value providing a modulation index in the range of from 1.3 to 1.6 so as to optimize the amplitudes of the two signals $f_1$ and $f_2$, both of which are utilized in the drop channeling relay station of Figure 1.

The maximum point on the curve for signal $f_2$ occurs when the modulation index is 1.86. This value of modulation index is most advantageous in a relay station not including the drop channeling equipment of this invention. It will be seen from Figure 2 that by the use of a modulation index of 1.44, the amplitude of the signal at frequency $f_2$ is only very slightly below the maximum amplitude corresponding with the modulation index of 1.86. At the same time, the amplitude of the signal at frequency $f_1$ is a great deal larger than it is when the modulation index is 1.86. Therefore, according to this invention, the amplitude of the signal $f_1$ applied to the crystal mixer 33 in Figure 1 is much greater than is obtained when the amplitude of the local oscillator is adjusted to provide a maximum output at frequency $f_2$. By this construction, less amplification is required in the intermediate frequency amplifier 35, and the drop channeling equipment is less expensive and more effective than would otherwise be the case. It may be noted that the curves for the relative values of the signals at frequencies $f_1$ and $f_2$ indicate the relative amplitudes of the center or carrier frequencies of 6000 megacycles and 6075 megacycles, and also indicate the relative amplitudes of the modulation frequency components surrounding these carrier frequencies.

The mixer-amplifier traveling wave tube 15 performs the necessary mixing or frequency translation function, and in addition it amplifies both of the signals at frequencies $f_1$ and $f_2$. It will be seen from the chart of Figure 2 that with a modulation index of 1.44 and because of the mixing action in the traveling wave tube 15, the output amplitudes at the frequencies $f_1$ and $f_2$ are about one-half the amplitude which the signal $f_1$ would have if no local oscillator signal were applied to the traveling wave tube 15. Stated another way, the amplification in the traveling wave tube 15 is about 6 db below what the amplification would be in the absence of the mixing function. A traveling wave tube may, for example, have an amplification of 40 db. The amplification of the mixer-amplifier 15 would then be 6 db less or 34 db. If the traveling wave tubes 12 and 28 also each have a gain of 40 db, the station of Figure 1 then has a total gain of 114 db.

The system of Figure 1 having a gain of 114 db may be compared with an alternative arrangement having three amplifying traveling wave tubes providing a total of 120 db of gain used together with a crystal mixer to provide the necessary frequency translation. A crystal mixer introduces a loss of about 10 db so that the total gain of such a system would be 110 db. It will be seen that the system of Figure 1 provides 4 db more gain than a system including three straight amplifying traveling wave tubes and a crystal mixer. An improvement of 4 db in the gain of a radio relay station is a matter of considerable commercial importance. Traveling wave tubes are relatively expensive devices and any system whereby increased gain can be obtained with a given number of traveling wave tubes is very important.

It is apparent that according to this invention there is provided a radio relay station including means for adding and dropping intelligence channels, and including a traveling wave tube mixer-amplifier so constructed and operated as to optimize the gain or amplification at both of the output frequencies from the traveling wave tube.

What is claimed is:

1. A radio relay station comprising a traveling wave tube having two inputs; means to apply a received intelligence modulated radio frequency signal at frequency $f_1$ to one of said inputs, a source of intelligence modulated local oscillations at frequency $f_0$ coupled to the other of said inputs, whereby energy at two radio frequencies $f_1$ and $f_2$ (where $f_2=f_1$ plus or minus $f_0$) is available at the output of said traveling wave tube, the amplitude of the signal from said local oscillator being such as to provide a modulation index of substantially 1.4, a bandpass filter to select the signal at frequency $f_2$ from the output of said traveling wave tube, means to transmit the signal $f_2$ derived from said bandpass filter, a second bandpass filter to select the signal at frequency $f_1$ from the output of said traveling wave tube, and means to demodulate said signal at frequency $f_1$ to obtain the intelligence therefrom.

2. A radio relay station with drop channeling comprising a traveling wave tube having a radio frequency input coupling and a source of beam voltage; a source of a received intelligence frequency modulated signal at frequency $f_1$ coupled to said input coupling of the traveling wave tube, a source of a local intelligence frequency modulated signal at frequency $f_0$ coupled to modulate said beam voltage of said traveling wave tube, whereby the output of said traveling wave tube includes intelligence modulated signals at frequencies $f_1$ and $f_2$, where $f_2$ is equal to $f_1$ plus or minus $f_0$; the amplitude of said local signal being such as to provide a phase shift of substantially 1.4 radians, means to separate and transmit the output signal at frequency $f_2$, and means to separate and demodulate the output signal at frequency $f_1$.

3. In a radio relay station having means to add and drop channels, the combination of a traveling wave tube having a radio frequency input coupling and a source of beam voltage; a source of received intelligence modulated signals at frequency $f_1$ coupled to said input coupling, a source of a local intelligence modulated signal at frequency $f_0$ coupled to modulate said beam voltage, whereby the output of said traveling wave tube includes intelligence modulated signals at frequencies $f_1$ and $f_2$, where $f_2$ is equal to $f_1$ plus or minus $f_0$; the amplitude of said local signal at frequency $f_0$ being adjusted to provide a modulation index in said traveling wave tube in the range between 1.3 and 1.6, bandpass filter means coupled to the output of said traveling wave tube to separate said two signals at frequencies $f_1$ and $f_2$, means coupled to an output of said filter means to amplify and transmit said signal at frequency $f_2$, and means coupled to another output of said filter means to amplify and demodulate said signal at frequency $f_1$.

4. A radio relay station comprising a radio frequency amplifying and phase modulating device having two inputs; means to apply a received intelligence modulated radio frequency signal at frequency $f_1$ to one of said inputs, a source of local oscillations at frequency $f_0$ coupled to the other of said inputs, whereby energy at two radio frequencies $f_1$ and $f_2$ is available at the output of said device, where $f_2$ equals $f_1$ plus or minus $f_0$, the amplitude of the signal from said local oscillator being such as to provide a modulation index of substantially 1.4, whereby to provide two output signals at frequencies $f_1$ and $f_2$ which are at substantially equal levels and both of which are modulated by the same intelligence, means to separate the two signals at the output of said device, means to retransmit the signal at frequency $f_2$, and means to demodulate the signal at frequency $f_1$ to obtain the intelligence therefrom.

5. A radio relay station as claimed in claim 1 and wherein said means to apply a received intelligence signal at frequency $f_1$ to one of said inputs includes a traveling wave tube amplifier, said means to transmit the signal $f_2$ including a further traveling wave tube amplifier.

References Cited in the file of this patent

UNITED STATES PATENTS

| | | |
|---|---|---|
| 2,421,727 | Thompson | June 3, 1947 |
| 2,456,466 | Sunstein | Dec. 14, 1948 |
| 2,477,570 | Berg | Aug. 2, 1949 |
| 2,593,113 | Cutler | Apr. 15, 1952 |
| 2,614,211 | Goodall | Oct. 14, 1952 |
| 2,688,107 | Salisbury | Aug. 31, 1954 |
| 2,691,065 | Thompson | Oct. 5, 1954 |
| 2,719,914 | Doehler | Oct. 4, 1955 |